US005971006A

United States Patent [19]

Seigerschmidt

[11] Patent Number: 5,971,006

[45] Date of Patent: Oct. 26, 1999

[54] INFLATABLE CUSHION WITH A VALVE

[76] Inventor: Helmut Seigerschmidt, Hackelfeld 11, Fiegenstall-Hottingen, Germany, 91798

[21] Appl. No.: 09/116,872

[22] Filed: Jul. 16, 1998

Related U.S. Application Data

[63] Continuation-in-part of application No. 08/611,945, Mar. 6, 1996, abandoned.

[30] Foreign Application Priority Data

Jun. 8, 1995 [DE] Germany .......................... 195 21 008

[51] Int. Cl.$^{6}$ .......................... F16K 15/20; A47C 16/00

[52] U.S. Cl. .......................... 137/223; 5/630; 5/646; 5/655.4; 5/911; 5/913

[58] Field of Search .......................... 137/223; 5/630, 5/644, 646, 647, 648, 655.3, 655.4, 911, 913; 602/6, 13, 20; 128/DIG. 20

[56] References Cited

U.S. PATENT DOCUMENTS

| | | | |
|---|---|---|---|
| 1,513,523 | 10/1924 | Rothhirsch | 473/610 |
| 1,644,096 | 10/1927 | Voit | 5/655.3 X |
| 2,062,248 | 11/1936 | Heck et al. | 473/599 X |
| 3,070,479 | 12/1962 | Meyer | 473/599 X |
| 3,426,891 | 2/1969 | Marks | 5/655.3 X |
| 3,745,998 | 7/1973 | Rose | 5/913 X |
| 3,762,404 | 10/1973 | Sakita | 602/6 |
| 3,864,766 | 2/1975 | Prete et al. | 5/644 |
| 3,953,655 | 4/1976 | Gore | 264/288 |
| 4,187,390 | 2/1980 | Gore | 174/102 R |
| 4,194,041 | 3/1980 | Gore et al. | 428/315 |
| 4,234,982 | 11/1980 | Bez et al. | 5/913 X |
| 4,493,870 | 1/1985 | Vrouenraets et al. | 428/245 |
| 4,657,003 | 4/1987 | Wirtz | 5/913 X |
| 4,725,481 | 2/1988 | Ostapchenko | 428/213 |
| 5,144,708 | 9/1992 | Pekar | 5/655.3 X |
| 5,475,882 | 12/1995 | Sereboff | 5/644 |

FOREIGN PATENT DOCUMENTS

| | | | |
|---|---|---|---|
| 1550186 | 7/1969 | Germany . | |
| 2504232 | 8/1976 | Germany . | |
| 9407862 | 5/1994 | Germany . | |
| 1591024 | 6/1981 | United Kingdom . | |
| WO85/05549 | 12/1985 | WIPO | 5/911 |

*Primary Examiner*—John Rivell
*Attorney, Agent, or Firm*—Gary A. Samuels

[57] ABSTRACT

A gasproof inflatable cushion with a hole which perforates it and whose edge is provided with an inner valve part on the inside and with an outer valve part on the outside such that the hole is enclosed and the construction is gasproof. The inner valve part is provided with a through-opening which ends in the cover hole and has such inner dimensions that the cover material can be pulled through the inner valve part and the outer valve part is provided with a through-part which ends in the cover hole at an inner opening and which ends outside at an outer opening. Gas pumped into the outer opening or extracted from the outer opening is pumped into or extracted from the inside of the cover through the through-part of the outer valve part and the through-opening of the inner valve part. The sealed edges of the covers forming the cushion are located on the inside.

14 Claims, 4 Drawing Sheets

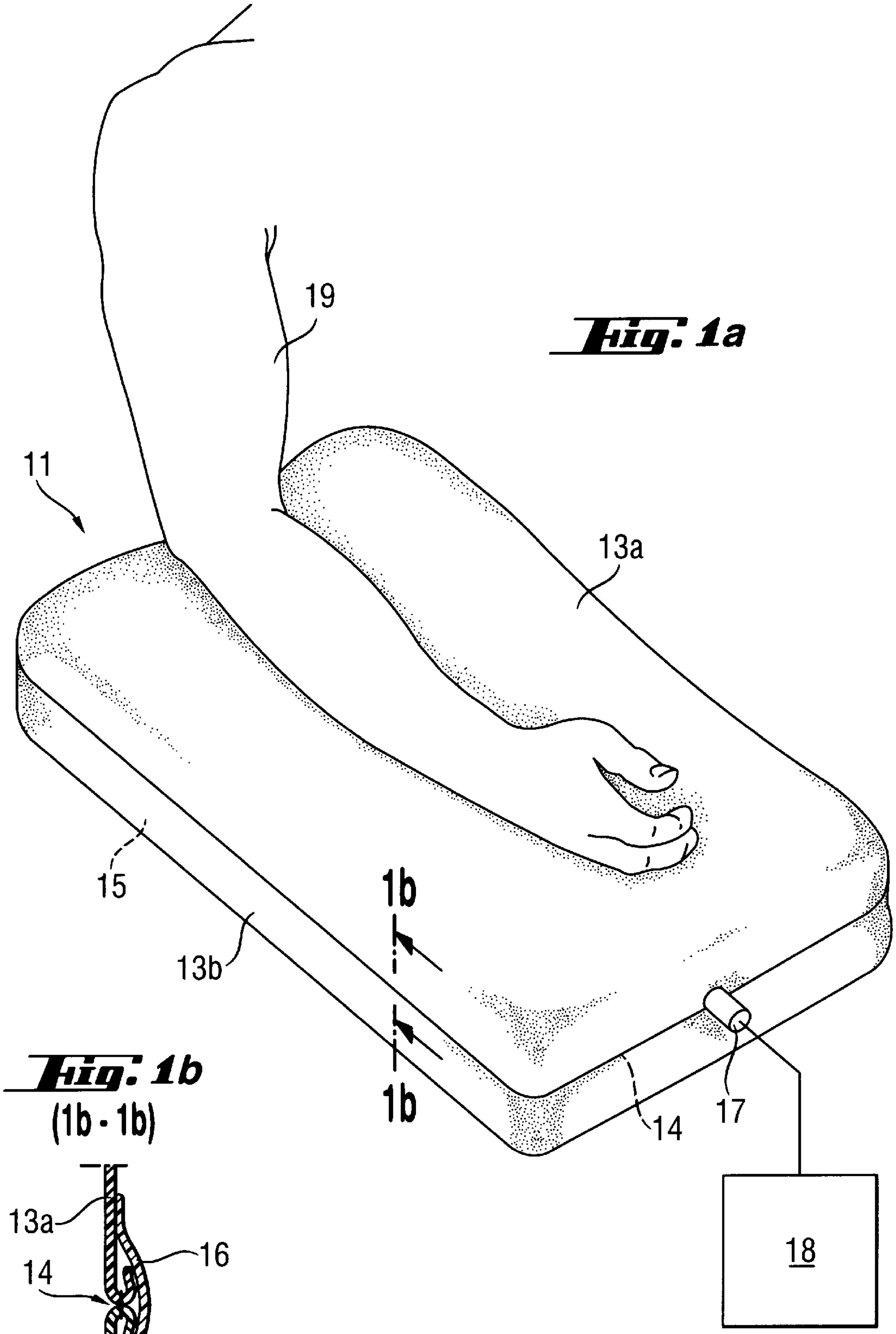
Fig. 1a
Fig. 1b
(1b - 1b)
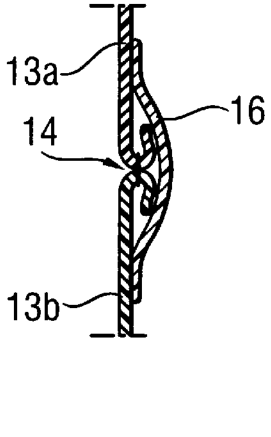

INFLATABLE CUSHION WITH A VALVE

RELATED APPLICATIONS

This application is a continuation-in-part of application of U.S. Ser. No. 08/611,945 filed Mar. 6,1996 now abandoned.

FIELD OF THE INVENTION

The invention relates to an inflatable cushion having a valve with an inner part and an outer part.

BACKGROUND OF THE INVENTION

Conventional cushions, e.g., serving as a pillow case or cover, are produced in which two superimposed cover parts are sewn together along their edges on three sides and then the pillow case or cover is turned inside out so that the seam edges are then located inside of the pillow case or cover. The side which was left open is closed by a zipper or the like. This does not provide a gas impermeable closure.

Conventional gas impermeable closures are produced in that two layers of a plastic film, e.g., two PVC-layers, are welded together on their outsides. Furthermore, dirt may collect in them, which is undesirable from a hygienic point of view.

A cushion of the invention is suitable for a positioning aid for positioning and holding stationary parts of a patient's body, in particular relative to a medical apparatus or a device for medical treatment or diagnosis, or a part thereof, e.g., a measuring coil of a magnetic resonance imaging tomograph.

Nowadays nuclear magnetic resonance tomography is being increasingly used in the framework of modern technology for medical diagnosis. For examining extremities, i.e. arms and legs, measuring coils in the shape of ring coils, surface flex coils and the like are slid over, e.g., an arm or a leg or placed on another body part to be examined, e.g. the torso, shoulder or neck. To obtain good investigation results, the body part to be checked should not perform any movements relative to the measuring coil during the measurement. This is very difficult because usually the scanning or measuring time of a nuclear magnetic resonance tomograph takes 30 to 45 minutes. During this long time the body part to be measured must be kept jitter-free to ensure a sufficiently clear insight into the body part to be examined for diagnosis.

At present, legs and arms are usually scanned by sliding a ring-shaped measuring coil or a surface coil of the nuclear magnetic resonance tomograph over the leg or arm to be scanned up to the area to be checked. Then the patient puts this body part, together with the measuring coil, onto a table or an adequate support. If another body part, e.g. part of the torso, is to be measured by applying a measuring coil, the person to be examined is placed onto a patient table. In many cases this depositing of the body part to be investigated together with the measuring coil does not result in the desired prevention of movements of the body part to be examined relative to the measuring coil during the long measuring time. As a consequence, the measuring results become less reliable.

As far as examinations of arms and legs are concerned, this problem is addressed by German Utility Model Application G 94 07 862.9, which suggests to mount a stand to the patient table on which the patient lies during a measuring process with a nuclear magnetic resonance tomograph. Said stand comprises a foot which is mounted next to the surface on which the patient lies such that it can be displaced relative to the patient table and an arm which is held angularly movable by a ball joint on one end of the stand's foot and which is provided with a holder for taking up a measuring coil on the other end.

Such a stand has proven useful because the body part to be examined can be kept effectively stationary even for an extended time.

However, such a stand is relatively expensive and requires the installation of various measuring coils on the measuring coil holder, depending on the body part to be examined. It may even be an obstacle when other body parts, e.g. torso parts, are to be measured. Furthermore, it may be difficult for some patients if their arm or leg is held only by a relatively short measuring coil compared to the length of the arm or leg for a relatively long time.

If, for instance, the torso area of a patient is placed on a patient table on which it is difficult to lie completely still, there is the danger of undesirable movements of the person.

These problems can be overcome by an inflatable cushion having a special valve, as described below.

SUMMARY OF THE INVENTION

Due to the special valve system of this invention, two gas-impermeable cover layers can first be welded or sewn and sealed all around their circumference to form a sealed edge while the side which will become the inside of the cushion later is located outside. Before or after the welding or sewing process, a hole perforating one cover is produced and the inner valve part is mounted to the side of the cover which at that time is still located outside but will be turned inside later on. After the inner valve part has been mounted and the welding or sewing process of the two cover parts has been completed, the sewn covers are stuffed through a through-opening of the inner valve part such that afterwards the former outside of the cushion, the welded or sewn edges, and the inner valve part are located inside of the cushion. After the outer valve part has been mounted to the side of the cover which is now the outside, the cushion can be inflated by means of the valve system comprising the inner valve part and the outer valve part and can also be evacuated again when necessary.

The following materials are particularly suitable for the waterproof, water vapor permeable material; microporous, expanded polytetrafluoroethylene (PTFE) as described in U.S. Pat. Nos. 3,953,566 and 4,187,390; expanded PTFE provided with hydrophilic impregnating agents and/or layers as described in U.S. Pat. No. 4,194,041; water-vapor permeable polyurethane layers; or elastomers, such as copolyetherester and laminates thereof, as described in U.S. Pat. Nos. 4,725,481 and 4,493,870.

In the following, the invention will be explained in more detail with reference to some embodiments and the following Figures which are schematic and not drawn to scale:

BRIEF DESCRIPTION OF THE DRAWINGS

FIG. 1*a* depicts a cushion 11 of the invention in one end-use.

FIG. 1*b* depicts a cushion blow-up of the welded edges of the cushion

DETAILED DESCRIPTION OF THE INVENTION

Figure 2:
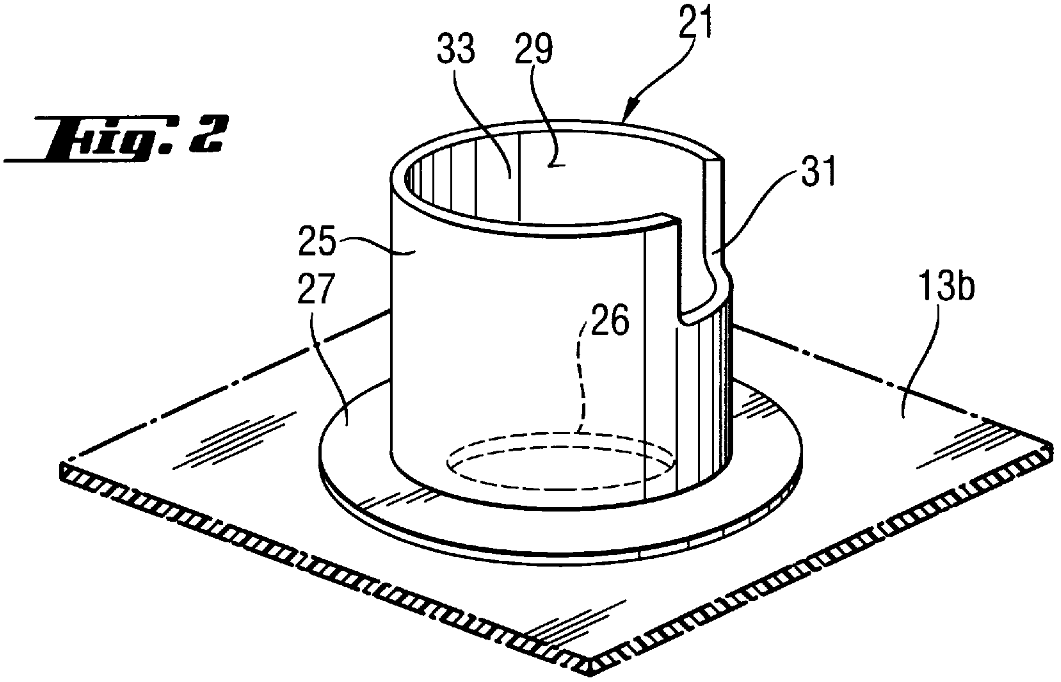
FIG. 2 is an inner valve part of a valve system used in cover 13 of cushion 11 of the invention.
Figure 3:
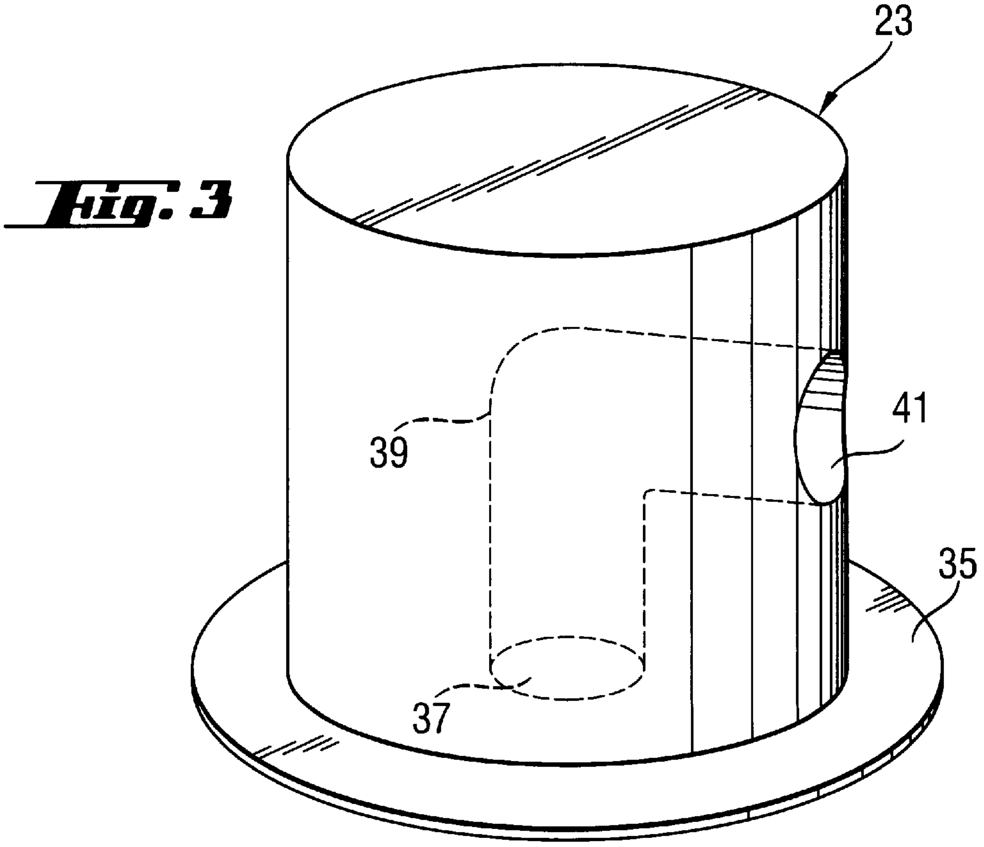
FIG. 3 is an outer valve part of this valve system.

FIGS. 2 and 3 show an inner valve part 21 and an outer valve part 23 of a valve system as it is preferably used for cushion 11 of the invention. The inner valve part 21 comprises a cylinder 25 which is open at both ends and to whose end shown as the lower end in FIG. 2 a cylinder flange 27 is connected. A cover 13*b*, which is only indicated in FIG. 2, is perforated by a hole 26 whose diameter is about the same size as the inner diameter of the cylinder 25. The inner valve piece 21 is gasproofly welded to the edge of this hole facing the interior by means of the cylinder flange 27.

A tube inlet opening 31 is provided at the edge of a cylinder opening 29 shown as the upper edge in FIG. 2. A tube can be placed into this opening to inflate cushion 11 with air or gas or to deflate the cushion 11.

The cylinder 25 which is open at both sides forms a through-opening 33 of such dimensions that the cover material can be pulled through the hole perforating the cover 13 and through the through-opening 33 of the cylinder 25 until the entire cover material is located above the top of the cylinder opening 29. In this way the entire cushion 11 can be turned inside out through the cylinder opening 29 until afterwards the outside of cushion 11 faces outwards and all welded edges of the cushion 11 are located inside. After the cushion 11 has been turned inside out the cylinder 25 and the cylinder flange 27 are also located on the inside of the cover 13*b*.

In the embodiment shown in FIG. 3 the outer valve part 23 has the shape of a cylinder. Its end shown at the lower end in FIG. 3 is equipped with a flange 35 on the outer valve part. By means of this flange 35 the outer valve part 23 is gasproofly welded to the outwardly directed edge of the hole 26 perforating the cover 13 after the cushion 11 has been turned inside out such that an inner opening 37 of a through part 39 going through the outer valve part 23 is aligned with the through opening 33 of the inner valve part 21. The through part 39 preferably has the same diameter as the cylinder 25 of the inner valve part 21. In the embodiment shown in FIG. 3 the through part 39 of the outer valve part 35 is angled and an outer opening 41 of the through part 39 ends outside at the circumference of the cylinder of the outer valve part 23.

One object of the invention is to provide for a cushion 11 that acts as a positioning aid which allows for a long and movement-free positioning of a body part to be examined in a simple, inexpensive way which is comfortable for the patient. In this use, the cushion 11 is a positioning device which is partly filled with particles and the outside of which is covered with a waterproof, water-vapor permeable material, or consists itself of such a material. A particularly suitable material is microporous polytetrafluoroethylene (ePTFE). The waterproof, water vapor permeable material may be provided with a textile knit on its outside, which increases comfort during use of the positioning device and protects the material outside.

The volume inside the cushion 11 can be changed by varying the enclosed gas quantity. For this purpose the cushion 11 is provided with the valve described above for charge or discharge of gas. The cushion 11 is filled with small particles up to a particle filling volume which is a predetermined fraction of the maximum inflation volume of the cushion. These particles are so small that they allow a shape adapted immersion of the body part to be positioned, at least partly. Their surface friction factor is such that when the cushion is evacuated until about the particle filling volume is reached they basically keep the position into which they were brought before evacuation. The particles preferably consist of small plastic globules. The system works as follows. In a state in which the cushion 11 is filled with more gas than the particle filling volume so that the particles can move freely within the cushion 11, the patient places the body part to be examined onto the outside of the cushion 11. Since the particles can be easily moved relative to each other in this state, the body part to be examined will, at least partly, sink into the cushion 11, as if it was placed into a heap of sand. Then an extraction unit is connected to the valve and the gas volume in the cover is reduced to about the particle filling volume. Due to this evacuation the particles are pressed together by covers 13*a*, 13*b* of the cushion 11 like in a shrinkage film. Due to their surface friction and this cover pressure the particles basically keep the positions which they had after the body part to be examined was placed onto the cushion 11 before evacuation. In other words, evacuation "freezes" the prior state. The evacuable cushion thus acts virtually like a shrinkage film whose shrinkage state can be undone again by gas inflation into the cushion 11.

During the evacuation or shrinkage state thus the positioning device maintains its immersion shape for the contours of the body part to be examined. Therefore the body part to be examined can remain for a long time in this immersion position which is optimally adapted to the outer contours of this body part. As a consequence, this body part can be immovably held on this positioning device as long as this is required for the measurement by means of a nuclear magnetic resonance tomograph.

The invention thus provides for a cushion 11 that acts as a positioning aid for body parts to be examined by nuclear magnetic resonance tomography, which ensures an inexpensive way of a secure immobilization of the body part to be examined, also for a relatively long time, which does not need to be firmly mounted to the patient table and which does not need to be modified for using measuring coils of different dimensions. Since an essential part of the body part to be examined can rest on this positioning aid and since the positioning aid is covered with or consists of a waterproof, water vapor permeable material so that perspiration moisture can be removed, this is a particularly comfortable positioning aid. Due to this material the positioning aid can be washed and kept clean without problems.

FIG. 1*a* shows the cushion 11 of the invention with the gasproof covers 13*a* and 13*b* made of microporous PTFE in which there is a multitude of small particles inside, in particular, small plastic globules 15. The gasproof covers 13*a*, 13*b* are sealed or welded by a tape 16 at their circumference to form a sealed edge 14. FIG. 1*b* shows a cross-section through I—I of FIG. 1*a* illustrating the sealed or welded edge 14. These plastic globules 15 are filled into the cushion only up to a fraction of the maximum filling volume of the covers 13*a*, 13*b* as described before. the cushion is provided with a valve 17, through which gas can be pulled out of or put into the cover. FIG. 1 shows the cushion in the state into which it was brought by evacuation after the arm and hand 19 was laid there. In this state the small plastic globules 15 fill the cushion 13 tightly; in the state shown in FIG. 1 the cushion has been evacuated to about the volume occupied by the particles and acts like a shrinkage cover. Therefore the small plastic globules are "frozen" in side cushion 11 during the evacuation state and maintain their position until gas can flow into the cushion through the valve 17 so that the 'frozen' state is reversed. The valve 17 is connected to a pump/extraction unit 18.

While the arm and hand 19 are positioned and secured as shown in FIG. 1*a*, a measuring coil of a nuclear magnetic resonance tomograph (not shown) may, e.g., be placed around the upper arm to perform a nuclear magnetic resonance measurement on the upper arm.

For the reasons stated above it is desirable that the welded cover edges of cushion 11 of the invention are located inside of the cushion 11 instead of outside as is shown schematically in FIG. 1*b*. This is achieved by a two-piece valve system of the type of the invention which is schematically drawn (not to scale) in FIGS. 2 and 3.

The small particles, preferably small plastic globules 15, which are inside of the cushion 11, can be filled in through the through-opening 33 of the inner valve part 21. The small plastic globules 15 are either filled into the cushion through the through-opening 33 before the cushion is turned inside out and are then also passed through the through opening or they are filled in through the through-opening 33 after the cushion has been turned inside out.

After the cushion 11 has been turned inside out and the plastic globules have been added, the outer valve part 35 is welded to the outside of the cover 13. The through-part 39 of the outer valve part 35 and the through opening 33 of the inner valve part 21 then creates a ventilation or extraction channel connecting the outside of the cushion 11.

Figure 4:
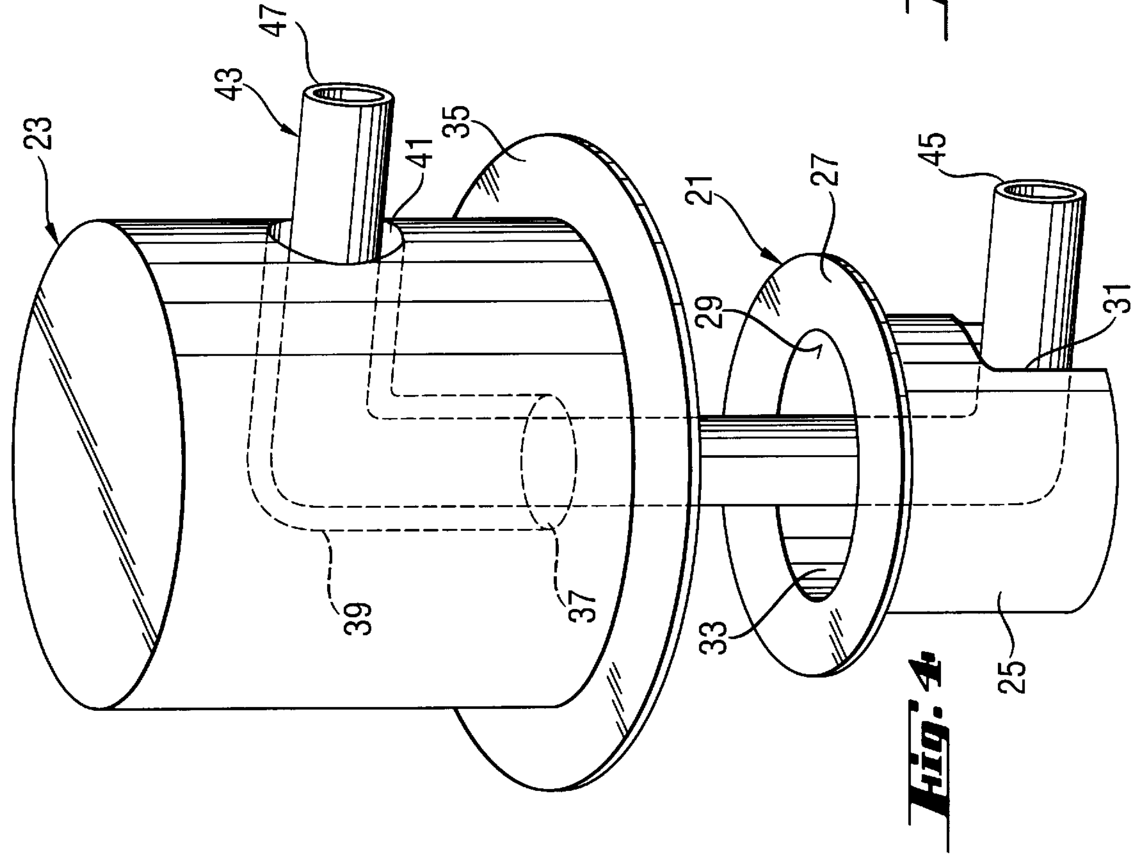
FIG. 4 is an embodiment of the valve system with a tube guided through it.

In the embodiment shown in FIG. 4 a tube 43 is guided through the through part 39 and the through opening 33. It has an inner end 45 which ends inside cover 13 and an outer end 47 which projects from the outer opening 41 of the outer valve part 35. The outer end can be connected permanently or temporarily to a pump/extraction unit 18 to put cushion 11 either in the shapable mode or the fixed mode depending on the requirements.

In some medical applications, cushion 11 is always used at the same site. In such cases it may be advantageous to connect the tube 43 permanently to a pump/extraction unit 18 to speed up inflation/deflation operations, which is advantageous if several patients are to be treated in a row. Furthermore, a permanent connection of tube 43 and pump/extraction unit 18 can be utilized to compensate for a loss of vacuum if cushion 11 is not completely tight.

The inner end 45 of the tube 43 is inserted into the tube through opening 31 and is held by its lateral walls. This ensures that the inner end 45 of the tube 43 is held relatively securely.

Figure 5:
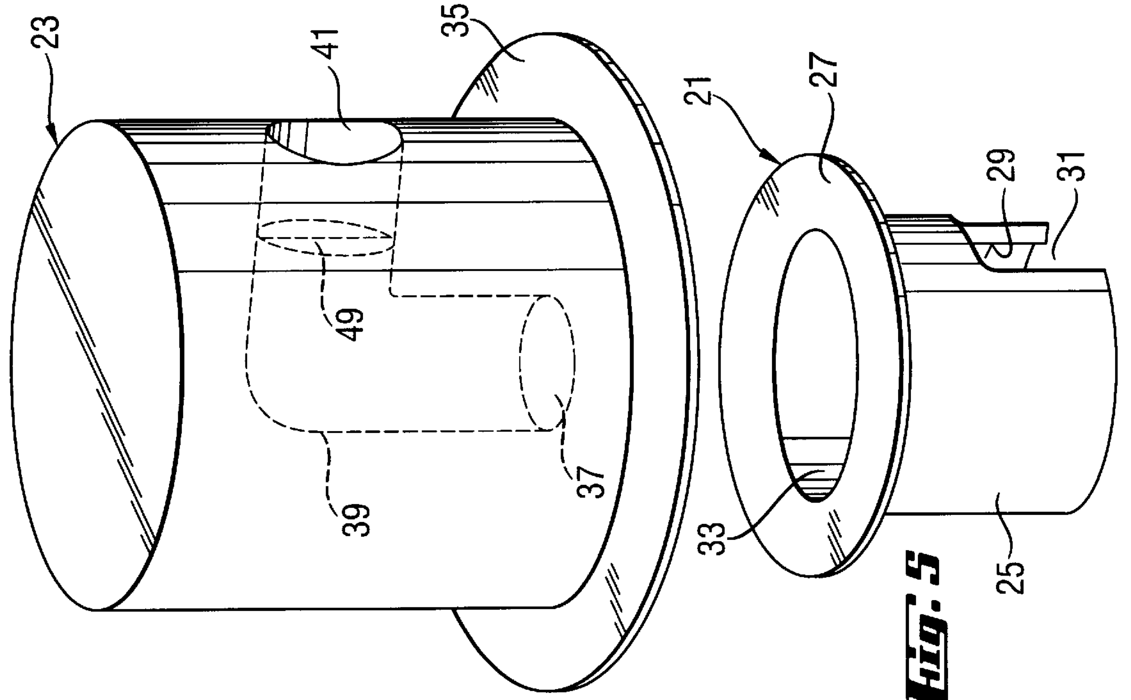
FIG. 5 is an embodiment of the valve system with integrated closing valve.

FIG. 5 shows an embodiment in which a closing valve 49 is arranged in the through part 39. It can be opened in that a tube (not shown in FIG. 5) which is inserted through the outer opening 41 into the through part 39 is pushed through the closing valve 49, which has closing lamellae, so that the cushion 11 can be supplied with air or air can be removed therefrom.

A sieve-like retaining grid (not shown) may be mounted to the through opening 33 of the inner valve part 21 and/or the through part 39 of the outer valve part 23 and/or the through part 39 of the outer valve part 23 to prevent the small particles 15 located within the cover 13 from escaping through valve unit 21, 23. This grid may be mounted at closing valve 49 or, if such a valve is not needed, instead of it.

The outer opening 41 of the outer valve part 35 may also be provided with a connection piece which can be connected to a conventional pump as it is used, e.g., to inflate bicycle tires, air mattresses or the like. In this case cushion 11 can be inflated or evacuated using such a pump.

The outer opening 41 can also be closed after a pumping or extraction process by a closing element (not shown in FIG. 5), e.g. in the form of a plug which fits into the outer opening 41.

Figure 6:
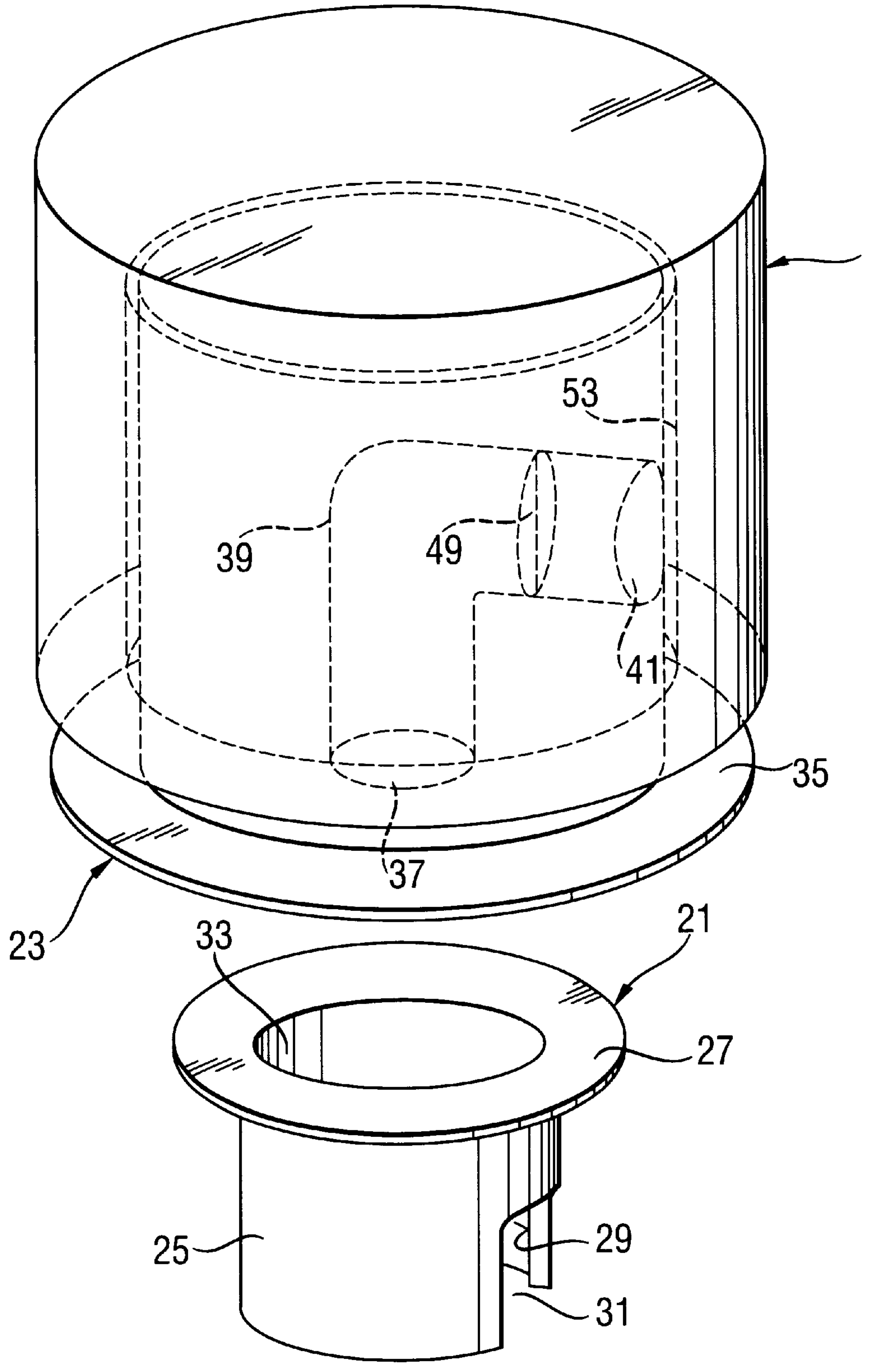
FIG. 6 is an embodiment of the valve system with a cap piece put onto the outer valve.

FIG. 6 shows an embodiment in which a closing element in the form of a cap piece 51 is used. It has the shape of a cylinder with an inner blind hole 53 whose inner dimensions correspond to the outer dimensions of the outer valve part 23. The cylinder of the cap piece 51 is so high that it goes completely over the outer opening 41 when it is completely plugged onto the outer valve part 35. Preferably the dimensions of the inner blind hole 53 are such that the cap piece 51 has a gasproof forced fit on the outside of the outer valve part 35.

The cap piece 51 can be used either instead of the closing valve 49 or in addition to it. In the latter case the valve closes particularly well.

Instead of welding the cylinder flange 27 of the inner valve part 21 and the flange 35 of the outer valve part to the cover material, adhesive bonding may be performed to (basically) achieve gasproofness.

In the embodiments shown in FIGS. 4 to 6 the cylinder parts of the two valve parts 21 and 23 extend to opposite sides of the cover area located between their cylinder flanges 27 and 35 when cushion 11 is in its final shape. After the cylinder flange 27 of the inner valve part 21 has been attached to the inside of one cover 13 which has been turned inside out, in another embodiment it is not only the cover 13 which is turned back through the through-opening 33 of the inner valve part 21 but also the cylinder 25 of the inner valve part 21 is pushed through its cylinder flange so that afterwards the cylinder is located on the opposite side of the cylinder flange 27 than before.

This is illustrated by FIGS. 2 and 3. FIG. 2 shows the outside of cover 13*b* which was turned back, the cylinder flange 27 which is located on the inside of cover 13*b* afterwards and the cylinder 25 of the inner valve part 21 projecting from the outside of cover 13 which has been turned back, i.e. which projects from the outside of the cushion 11. Then the outer valve part 23 is mounted to this cylinder 25 which projects from the outside of the cover 13*b* in exactly the same alignment in which FIG. 3 is shown to FIG. 2. In other words, the two FIGS. 2 and 3 can be seen as a single figure as far as the mounting of the outer valve part 23 onto the cylinder 25 of the inner valve part 21 is concerned.

There are two possibilities for the cylinder 25: It may be arranged either inside of or outside of the through part 39. In the first case, the cylinder part of the outer valve part 23 may consist of a full material integrating the through part 39, e.g. produced by injection molding. In the latter case the cylinder area of the outer valve part 23 may be designed hollow, like a cylindrical hat, and its interior through part 39 may be formed by a pipe or tube.

If the cylinder 25 is arranged within the through part 39, the outer diameter of the cylinder 25 of the inner valve part 21 and the inner diameter of the through part 39 of the outer valve part 23 are preferably adapted to each other such that the through part 39 accommodates the cylinder 25 either in a snug fit or even in a forced fit.

If the through opening 33 takes up the through part 39 the inner diameter of the through opening and the outer diameter of the through part can be dimensioned accordingly. The tube inlet opening 31 in the cylinder wall of the inner valve part 21 may be used to take up part of the outer circumference of the part of the through part 39 which is horizontal in FIG. 3. This reduces the total height of the inner valve part 21 and the outer valve part 23 of the valve unit.

The covers 13*a*, 13*b* of cushion 11 may be additionally provided with a foam material cover on its outside. This affords a better pressure distribution, e.g. when the patient's head is to be placed on the cushion. Compared to a pure foam material pillow an optimal adaptation to the head is possible and unpleasant pressure on one side of the head, as it may occur if a pillow consisting of foam material is used, is avoided. Therefore the cushion of the invention can also be advantageously used as an (orthopedic) pillow, not only for sick persons but also for healthy persons, to optimally support the head and cervical spine area.

The cushion 11 can be used not only for a temporary positioning of body parts to be measured by a nuclear magnetic resonance tomograph but for example also in connection with x-ray examinations or other diagnosis methods or simply as a means for temporarily or permanently placing or bedding a patient as required.

For example, it affords valuable help as far as decubitis is concerned, i.e. bedsores occurring when persons are bedridden for a long time due to illness or age. As a countermeasure a part having the shape of the sore body part can be placed onto the cushion and its shape can be impressed by evacuation such that it lasts. After removing the shaping part, the patient can be placed on the cushion such that the sore area lies at the shaped part of the cushion and there is no pressure on the sore area.

The cushion 11 of the invention may also be used successfully in connection with surgery. The position of the patient can be made stationary as required in each phase of the operation without having to use various other cushions or wedges.

I claim:

1. A gasproof inflatable cushion comprising two covers joined together and welded by a tape at their circumference to form a welded edge on a first side, the cushion having an inside located between the two covers, wherein one of the covers is perforated by a cover hole and the first side with the welded edge is located on the inside.

2. The cushion of claim 1, wherein the cover hole has such inner dimensions that the two covers can be pulled through the cover hole.

3. The cushion of claim 1, wherein the cover hole is provided with an inner valve part on the inside and with an outer valve part on the outside of the cover, the outer valve part being provided with a through-part which ends in the cover hole at an inner opening and which ends outside at an outer opening, the inner valve part being provided with a throuqh-openinq extending from the inside of the cushion to the throuqh-part of the outer valve, such that gas pumped into the outer opening or extracted from the outer opening is pumped into or extracted from the through-part of the outer valve part and the through-opening of the inner valve part to inflate or deflate the cushion.

4. The cushion of claim 3, wherein the inner valve part and the outer valve part are provided with one welded or adhesively bonded flange, each which is gasproofly welded to the welded edge.

5. The cushion of claim 3, wherein a pumping/extraction hose or pipe is guided through the through-opening of the inner valve part and the through-part of the outer valve part and that its inner end projects into the cushion and its outer end is adapted to be connected to a pumping or extraction unit.

6. The cushion of claim 3, wherein a closing valve is arranged in the through-passage of the outer valve part and/or the through-opening of the inner valve part which can be made gas-permeable by putting through a tube or pipe which is connected to the pumping or extraction unit.

7. The cushion of claim 3, wherein the outer opening of the through-part of the outer valve part is provided with a closing valve to which a pumping/extraction device is connectable.

8. The cushion of claim 3, wherein a closing element for the outer opening can be put on the outer opening of the through-part of the outer valve part and in a closed position gasproofly seals the outer opening.

9. The cushion of claim 8, wherein the closing element of the outer opening is formed by a closing cap, which is put onto the outer valve part.

10. The cushion of claim 8, wherein the closing element of the outer opening is formed by a cap part, which is put onto the outer valve part in a gasproof fit.

11. The cushion of claim 1, wherein the cushion is filled by a plurality of small plastic globules.

12. The cushion of claim 1, wherein the covers are made from a waterproof, water vapor permeable but gasproof material.

13. The cushion of claim 12, wherein said waterproof, water vapor permeable but gasproof material is microporous polytetrafluoroethylene.

14. The cushion of claim 12, wherein said covers are provided with a foam material cover on the outside of the cushion.

* * * * *